United States Patent
Kang

(10) Patent No.: US 8,515,165 B2
(45) Date of Patent: Aug. 20, 2013

(54) METHOD OF DETECTING AN OBJECT USING A CAMERA

(75) Inventor: Woo-Sung Kang, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 296 days.

(21) Appl. No.: 12/977,645

(22) Filed: Dec. 23, 2010

(65) Prior Publication Data

US 2011/0158518 A1 Jun. 30, 2011

(30) Foreign Application Priority Data

Dec. 24, 2009 (KR) ........................ 10-2009-0130975

(51) Int. Cl.
*G06K 9/00* (2006.01)
(52) U.S. Cl.
USPC .......................................... 382/165; 382/170
(58) Field of Classification Search
None
See application file for complete search history.

(56) References Cited

U.S. PATENT DOCUMENTS

| | | | | |
|---|---|---|---|---|
| 3,912,859 | A * | 10/1975 | Christopherson | 348/169 |
| 3,974,328 | A * | 8/1976 | Thomas et al. | 348/169 |
| 5,107,293 | A * | 4/1992 | Sekine et al. | 396/55 |
| 5,614,945 | A * | 3/1997 | Sekine et al. | 348/207.99 |
| 6,002,793 | A * | 12/1999 | Silver et al. | 382/152 |
| 6,477,260 | B1 * | 11/2002 | Shimomura | 382/106 |
| 7,187,783 | B2 * | 3/2007 | Moon et al. | 382/103 |
| 8,204,278 | B2 * | 6/2012 | Edanami | 382/104 |
| 2003/0128298 | A1 * | 7/2003 | Moon et al. | 348/578 |
| 2005/0147278 | A1 * | 7/2005 | Rui et al. | 382/103 |
| 2006/0023914 | A1 * | 2/2006 | Gold | 382/103 |
| 2006/0088191 | A1 * | 4/2006 | Zhang et al. | 382/107 |
| 2008/0187173 | A1 * | 8/2008 | Kim et al. | 382/103 |
| 2009/0028389 | A1 * | 1/2009 | Edanami | 382/104 |
| 2009/0226037 | A1 * | 9/2009 | Yang et al. | 382/103 |
| 2010/0226532 | A1 * | 9/2010 | Hayasaka et al. | 382/103 |
| 2011/0001840 | A1 * | 1/2011 | Ishii et al. | 348/222.1 |

FOREIGN PATENT DOCUMENTS

| | | |
|---|---|---|
| JP | 2004348273 | 12/2004 |
| JP | 2008020951 | 1/2008 |
| KR | 100751407 | 8/2007 |
| KR | 1020090099349 | 9/2009 |

OTHER PUBLICATIONS

C. H. Lampert, M. B. Blaschko, and T. Hofmann, "Beyond sliding windows: Object localization by efficient subwindow search," in Proc. IEEE Conf. Comput. Vis. Pattern Recognit., 2008, pp. 1-8.*

* cited by examiner

*Primary Examiner* — Barry Drennan
*Assistant Examiner* — Feng Niu
(74) *Attorney, Agent, or Firm* — The Farrell Law Firm, P.C.

(57) ABSTRACT

A method of detecting an object using a camera is provided, which includes dividing image data into pre-established areas, creating a detection window for each area, and calculating a histogram for each created detection window. Weights are determined for each pixel located within each detection window according to a determined similarity between a pre-stored histogram corresponding to the object and the histogram corresponding to the detection window. Each detection window is moved in a direction corresponding to the determined weights according to an average movement to converge the detection windows towards the object and a detection window is selected having a histogram with maximum similarity to the pre-stored histogram corresponding to the object from the detection windows converging to the object.

15 Claims, 7 Drawing Sheets

METHOD OF DETECTING AN OBJECT USING A CAMERA

PRIORITY

This application claims the priority under 35 U.S.C. §119 (a) to an application filed in the KIPO on Dec. 24, 2009 and assigned Serial No. 10-2009-0130975, the contents of which are incorporated herein by reference.

BACKGROUND OF THE INVENTION

1. Field of the Invention

The present invention relates generally to a method of detecting an object, and more particularly, to a method of detecting an object using a camera, wherein a detection window is created for every area in image data to which the object is input, and a similarity between a histograms is maximized through a comparison of a similarity for each of the pixels on the basis of a calculation of the histograms between the object and the detection window, such that the detection window converges to the location of the object.

2. Description of the Related Art

A method for detecting an object through use of a mobile camera, such as detecting a user's hand, for example, frequently varies in its configuration. Such a method generally includes pre-establishing a recognizable configuration of the hand or a pattern of the hand, and detecting the configuration of the hand within an image input through the camera.

Many methods of detecting an object through use of a mobile camera include defining respective objects corresponding to input signals; and comparing a pre-learned or a pre-stored object with an object in the current input image. Various methods of detecting an object using the camera may be classified into categories such as a global area detection method, color detection method, and a differential image detection method, which are described in further detail as follows:

Global Area Detection Method

The global area detection method has been developed for various applications including face detection, intruder detection and detection of a vehicle's license plate. As illustrated in FIG. 1, the method for detecting a global area is includes sequential detection. More specifically, the global area detection method primarily includes modeling an object through statistical learning or extracting a local characteristic; storing information obtained from the modeling; and detecting the object by sequentially investigating a global area of an input image in a direction from a left-upper side to a right-lower side of the image. The global area detection method requires many calculations due to the moving, comparing and analyzing performed over the global area. Therefore, the global area detection method is not applied to a system having a limited calculation capability. Additionally, it is impossible to detect an object like a hand through a global area detection method, since the configuration of the hand variously changes, and this method is designed without any consideration of rotational changes of an object. The global area detection method often fails, due to a blur phenomenon that occurs when an object such as a hand moves near the camera quickly.

Color Detection Method

As illustrated in FIG. 3, the color detection method enables an object to be detected by defining a range within a color space for the color of the object and obtaining pixels that fall within the range. This method has the disadvantage in that it is difficult to use the color detection method for modeling in circumstances where the object to be detected does not have a single color, such as people's skin color, for example.

Since all objects having colors within the defined color range may be detected as an object, unwanted objects in other locations may be obtained, thereby making it more difficult to determine the correct location of the desired object.

Differential Image Detection Method

As illustrated in FIG. 2, according to the differential image method, and object is detected by obtaining a difference between two consecutive frames and sensing a change in a pixel value. In the differential image method, it is impossible to detect the object when the camera shakes or moves. Even if the object is detected using this method, the boundary in the edge information may be unclear after grouping pixels located in the object. In a variation of the differential image detection method, the object is detected by learning and storing a background model and renewing the background model according to change in time. The variation of the differential image detection method requires calculation of a mean value and a dispersion value in each channel, for each pixel in each consecutive frame. Accordingly, the differential image method is inappropriate for systems that have limited calculation capabilities and limited memory capacities.

Further, the differential image method is unable recognize the location of an object that has limited movement or is completely stationary.

SUMMARY OF THE INVENTION

Accordingly, the present invention has been made to solve the above-mentioned problems occurring in the prior art, wherein the embodiments of present invention use object information obtained through statistical learning without investigation of a global area of image data and minimize background shaking and the mis-detection due to color detection, in order to consecutively detect the object and enable detection of the object's location with limited calculation capabilities.

In accordance with an aspect of the present invention, a method of detecting an object using a camera is provided. The method includes dividing image data including the object into pre-established areas and creating a detection window for each area; calculating a histogram for each created detection window; determining, for each one of the detection windows, weights for each pixel located within the one of the detection windows according to a determined similarity between a pre-stored histogram corresponding to the object and the histogram corresponding to the one of the detection windows; moving each of the detection windows in a direction corresponding to the determined weights according to an average movement, such that the detection windows converge towards the object; and selecting, from among the detection windows, a detection window having a histogram with maximum similarity to the pre-stored histogram corresponding to the object from the detection windows converging to the object to thereby detect and track the location of the object.

In accordance with another aspect of the present invention, a non-transitory computer-readable recording medium for executing a method of detecting an object using a camera is provided. The method includes dividing image data including the object into pre-established areas and creating a detection window for each area; calculating a histogram for each created detection window; determining, for each one of the detection windows, weights for each pixel located within the one of the detection windows according to a determined similarity between a pre-stored histogram corresponding to the object and the histogram corresponding to the one of the detection windows; moving each of the detection windows in a direction corresponding to the determined weights according to an average movement, such that the detection windows converge towards the object; and selecting, from among the detection windows, a detection window having a histogram with maximum similarity to the pre-stored histogram corresponding to the object from the detection windows converging to the object to thereby detect and track the location of the object.

In accordance with another aspect of the present invention, a portable terminal including a media in which a program for executing a method of detecting an object using a camera is recorded. The method includes dividing image data including the object into pre-established areas and creating a detection window for each area; calculating a histogram for each created detection window; determining, for each one of the detection windows, weights for each pixel located within the one of the detection windows according to a determined similarity between a pre-stored histogram corresponding to the object and the histogram corresponding to the one of the detection windows; moving each of the detection windows in a direction corresponding to the determined weights according to an average movement, such that the detection windows converge towards the object; and selecting, from among the detection windows, a detection window having a histogram with maximum similarity to the pre-stored histogram corresponding to the object from the detection windows converging to the object to thereby detect and track the location of the object.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Figure 1:
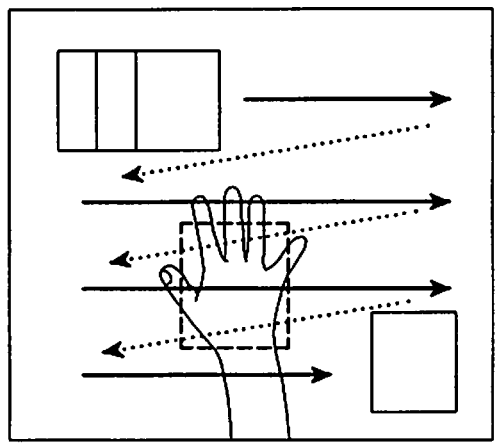
FIG. 1 is a diagram illustrating a conventional method of detecting a global area when detecting an object.
Figure 2:
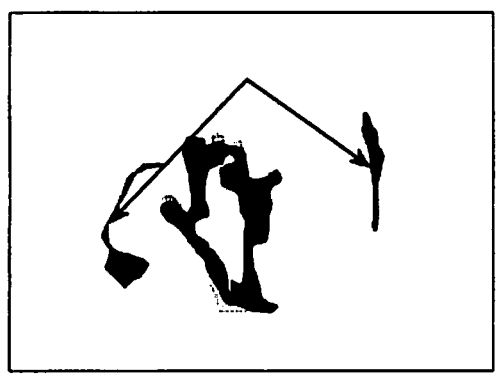
FIG. 2 is a diagram illustrating a conventional method of detecting color when detecting an object.
Figure 3:
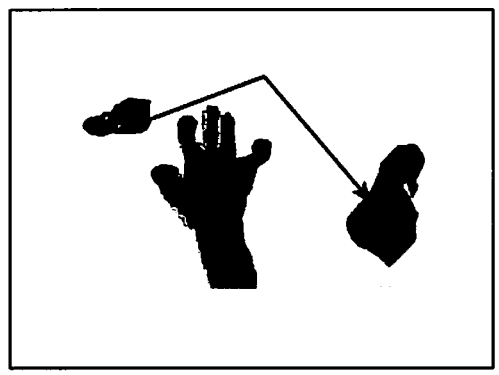
FIG. 3 is a diagram illustrating a conventional method of detecting a differential image when detecting an object.

Hereinafter, embodiments of the present invention are described with reference to the accompanying drawings. In the following description, various specific definitions found in the following description are provided only to help general understanding of the present invention, and it is apparent to those skilled in the art that the present invention can be implemented without such definitions.

According to an embodiment of the present invention, movement of an object in a photographed image is recognized through the use of object information, which is pre-stored through statistical learning with respect to the image. Since the corresponding object is robust against various disturbing factors (e.g., as a shaking background, a background similar to the corresponding object in color, etc.), only the characteristic movement of a target close to a histogram of the corresponding object in the image is considered. Thereby, a method of detecting the object using the camera according to an embodiment of the invention is robust against the various disturbing factors, is performed quickly, and may be adopted in many various applications. For instance, embodiments of the present invention may be applied to selective type-user interfaces, such as in a photograph-viewing application, a game playing, and a cursor or a pointer controlled by a mouse for menu selection.

In the following description, the "object" (i.e., the photographed target) is represented by a user's hand in the drawings as an example for the convenience of the description. However, embodiments of the present invention are not limited thereto, and other various objects may be used according to embodiments of the present invention, depending on types of input provided to various applications.

Hereinafter, a method of detecting the object using a camera in accordance with an embodiment of the present invention is described with reference to FIG. 4.

FIGS. 4A through 4D are views of screens illustrating schematic operations of tracking a location of the object, wherein the method of detecting the object using the camera in accordance with the embodiment of the present invention is applied thereto. FIGS. 4A through 4D illustrate four image frames, respectively, according to the movement of the object, the image frames continuing in time order.

Figure 4A:
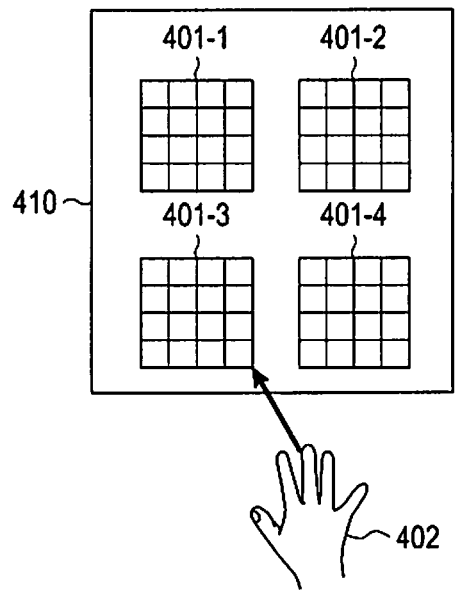
FIGS. 4A-4D are diagrams of screens illustrating operations to which a method of detecting an object using a camera in accordance with an embodiment of the present invention is applied.

As shown in FIG. 4A, image data 410, to which an object 402 is input from a camera, is divided into predetermined areas and detection windows 401-1, 401-2, 401-3, 401-4 are created for each divided area.

Detection windows 401-1, 401-2, 401-3, and 401-4 may be created for each divided area of the entire image data frame. Otherwise, the detection windows may be created for the corresponding object to be detected, which is displayed on a screen, or for the corresponding object, which is determined according to a default value stored in a memory.

Histograms are calculated for the detection windows 401-1, 401-2, 401-3, and 401-4, each of which is created in the predetermined area of the image data 410. The histogram is a distribution of the brightness of pixels of the image within a certain window. At the time of the example illustrated in FIG. 4A, regarding the image data 410, the object 402 has not yet entered into the image data 410 (based on the R, G, B channels and edge information), and thus, during this time, the image in the windows 401-1, 401-2, 401-3, and 401-4 does not change. Accordingly, the pixels do not change or only have minor changes, and thus there is little difference between the histogram of the current-input image data 410 and a histogram corresponding to previously-input image data.

Figure 4B:
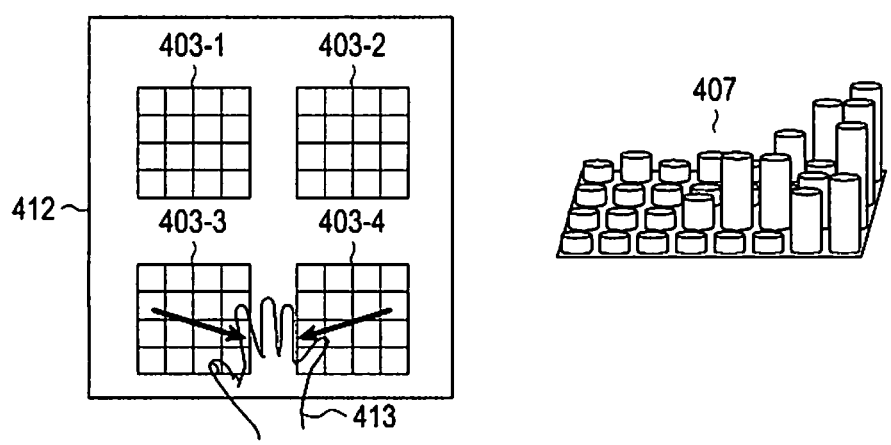

Thereafter, when the area in which the object 413 is located partially overlaps the areas in which the detection windows are located, such as illustrated in FIG. 4B, image data 412 including the object 413 is provided as input, and therefore, weight for every pixel in one of the detection windows has a form denoted by histogram 407, for example.

Figure 4C:
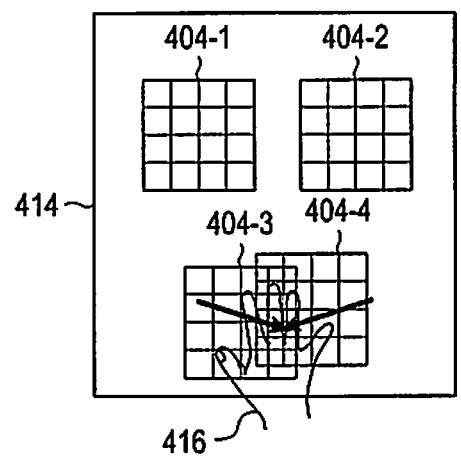

As illustrated in FIG. 4C, if the histograms are created for the detection windows 404-1, 404-2, 404-3, and 404-4 based on the histogram in the image data with the object 416 input therein, each of the pixels located in each one of the respective detection windows is provided with the weight on the basis of the similarity of the histograms for detection windows 404-1, 404-2, 404-3, and 404-4 compared to a pre-stored histogram of the object.

Figure 4D:
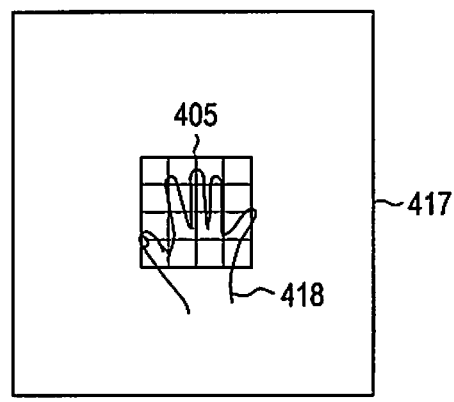

The detection windows 404-3 and 404-4 are provided with the weight for every pixel and sequentially converge to the object 418 for image data frame as time progresses on the basis of the movement of the object. As illustrated in FIG. 4D, a detection window 405, the histogram of which has a greatest similarity to the pre-stored histogram of the object, is selected from the detection windows 404-3 and 404-4 that are converging to the object 418, while the other detection windows (e.g., 404-1 and 404-2), the histogram of which do not have the greatest similarity to the pre-stored histogram, are deleted. With the use of the selected detection window 405, the location of the object may be detected and tracked in subsequently input frames.

Hereinabove, a method of detecting an object using a camera in accordance with an embodiment of the present invention is schematically described with reference to operations performed with respect to a screen of the apparatus adopting the method of the present invention. Herein below, the same method of detecting the object using the camera in accordance with an embodiment of the present invention is described in more detail.

Figure 5A:
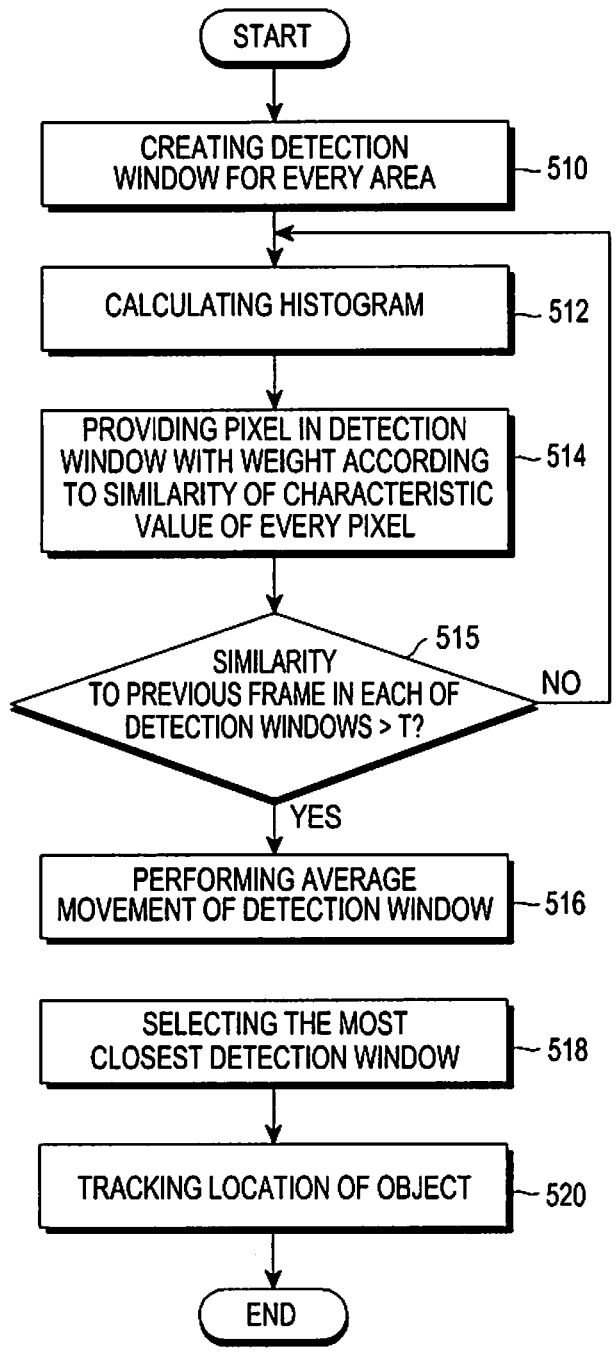
FIG. 5A is a flow chart illustrating a method of detecting an object using a camera in accordance with an embodiment of the present invention.
Figure 5B:
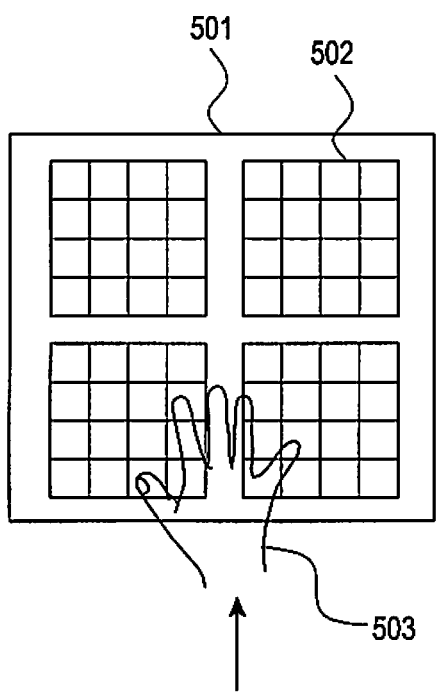
FIGS. 5B-5D are diagrams of screens according to the method of FIG. 5A.
Figure 5C:
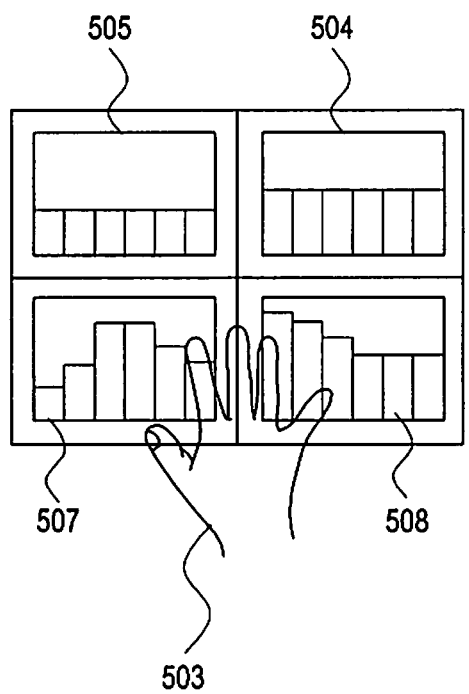
Figure 5D:
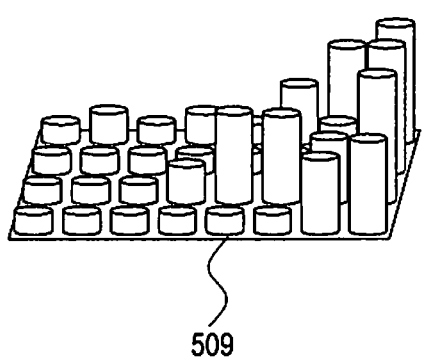

FIG. 5A is a flow chart illustrating a method of detecting an object using a camera in accordance with an embodiment of the present invention. FIGS. 5B-5D are diagrams of screens according to the method of FIG. 5A. Referring to FIGS. 5A-5D, image data 501, which includes the object input from the camera, is divided into pre-determined areas, and detection windows 502 are created for each of divided areas, in Step 510, with FIG. 5C illustrating various displays within each of the detection windows (504-508) within the image display.

Each of the detection windows 502 in FIGS. 5B and 504-508 in FIG. 5C is a block having a predetermined number of pixels and may be positioned at many locations to which the object possibly moves. In other words, the number of pixels in the block and the number of blocks are determined and created according to characteristics (e.g., size) of a screen displaying the image data 501.

A detection window may be created for the entire image data frame. Alternatively, the detection window may be created for the corresponding object to be detected, which is displayed on a screen displaying image data, or the detection window may be created for a corresponding object that is determined according to a default value stored in a memory.

The creation of the detection window corresponds to a virtual step (i.e., an internally operating step, which does not correspond to providing the detection window to a display), and therefore, the image data may include "N" detection windows (where "N" is the number of detection windows), and the object in the image data may be treated as a block unit having a predetermined number of pixels.

In Step 512, a histogram is calculated for every detection window created in each of the predetermined areas of the image data.

The histogram includes at least one characteristic vector of the edge information, the brightness, etc. for pixels of the image in a certain window. As illustrated in FIG. 5D, the histogram 509 includes a plurality of rods for the detection window in each corresponding area.

The histogram is created for each detection window for each of the image data frames, i.e., the histograms are created for every consecutive frame. The histogram of the detection window may be represented by Equation (1):

$$R_i = \{r_n^i\}_{n=1,\ldots,m}, \sum_{n=1}^{m} r_n^i = 1. \text{ for } i = 1, \ldots, k \quad (1)$$

In Equation (1), $R_i$ is the histogram for the detection window, "i" represents an $i^{th}$ area in the image window to which the object is input, "k" is the total number of windows in which the histogram is calculated, and m is a total number of bins in the pre-stored histogram.

After creating the histograms corresponding to the detection windows for each area, on the basis of the histogram in the image data to which the object is input, each of the pixels in each detection window is provided with a weight based on similarity of the histogram of the detection window to the pre-stored histogram corresponding to the object in Step 514.

The pre-stored histogram corresponding to the object is designated by pre-stored histogram (T), and is produced in a multi-dimensional space using edge information and the Red/Green/Blue (RGB) channels of each pixel; the pre-stored histogram may be represented as in Equation (2):

$$T = \{t_n\}_{n=1,\ldots,m}, \sum_{n=1}^{m} t_n = 1. \quad (2)$$

In Equation (2), "n" is an index of a bin and "m" is the total number of bins in the pre-stored histogram "T".

More specifically, the similarity of each detection window to the object is determined by comparing the characteristic value of each pixel in the pre-stored histogram corresponding to the object with that of a corresponding pixel in the detection window. For at least one pixel of a detection window having values similar to the characteristic values for each pixel in the histogram corresponding to the object in the detection window, the at least one pixel of the detection window is provided with a greater weight than another pixel of the detection window.

In performing the above-described Step 514, the more similar the characteristic values of each pixel in the histogram on the basis of the RGB channel and the edge information are to the characteristic values of each pixel in the detection window, the greater the determined weight will be for the detection window. The weight may be obtained according to Equation (3).

$$w_l^i = \sum_{n=1}^{m} \frac{t_n}{r_n^i} \delta[b(x_l) - n]. \quad (3)$$

In Equation (3), $w_l^i$ is a weight of a $l^{th}$ pixel of an $i^{th}$ pixel for which a weight is determined, $b(x_l)$ is a function for obtaining the index of the histogram to which the color of the pixel at the location $x_l$ belongs, $\delta$ is a function causing weight $w_l^i$ to equal $t_n/r_n^i$ when $n=b(x_l)$ and to otherwise equal zero, n is an index of a bin for the histogram T, t is frame number, and m is a total number of bins in the pre-stored histogram.

By using weights obtained through Equation 3, a new position of the detection window is sought through repeated calculations according to Equation (4) as shown below, until the movement of the detection window provided with the weight converges to the object below a critical value.

$$\|x^{new} - x^{old}\| > \epsilon \text{ and} \qquad (4)$$

$$x^{new} \leftarrow \frac{\sum x_k^{old} w_k^i}{\sum w_k^i}$$

In Equation (4), $w_k^i$ is a weight of a $k^{th}$ pixel in the an $i^{th}$ area for which a weight is determined, $\epsilon$ is a critical value, and x is a location of the detection window.

Histogram 509 (FIG. 5D) shows the weighted pixels in the detection window. In Step 516, the detection window is moved according to an average movement in a direction determined according to the weight calculated in Step 514.

Due to the movement performed in Step 516, the weighted detection window sequentially converges to the object according over time through each frame in the image data, according to movement of the object.

Thereafter, detection window closest to the object is determined according to the convergence of the detection windows in Step 518.

Remaining detection windows other than the detection window that is determined to be closest to the object are deleted. Depending on the movement direction of the object, the characteristic value of each pixel located in the detection window for each area may change while concentrating in the corresponding movement direction. Accordingly, if the characteristic values of the pixel in a detection window do not change or if the changes are small, such a detection window is deleted, since it cannot be determined whether the object moves near the area corresponding to such a detection window. The change in the characteristic value of each pixel in a detection window for each consecutive frame is determined using Equation (5).

$$f(R_i^t, R_i^{t-1}) = \sum_{n=1}^{m} \sqrt{r_n^{i,t} * r_n^{i,t-1}} \qquad (5)$$

If a calculated result according to Equation (5) is below a critical value for the detection window in each area (i.e., if the characteristic value of every pixel in the detection window in each area has very little or no change over time), the detection window located in the predetermined area in the current frame will not be used for the detection at its current location. This detection window is then moved to its original location for subsequent detection.

Thereafter, the location of the object in the subsequently-input frame is detected and tracked in Step 520, according to the detection window selected in step 518.

Methods of detecting the object using a camera according to various embodiments of the present invention may be embodied and/or implemented by various hardware, software (e.g., a program), or a combination thereof. Such a program may be stored in a volatile or non-volatile recording medium that may be read by a machine, such as a computer. The recording medium may include a memory device, such as Read Only Memory (ROM), Random Access Memory (RAM), a memory chip, a memory, such as an Integrated Circuit (IC), an optical or magnetic recording medium, such as a Compact Disc (CD), a Digital Versatile Disc (DVD), a magnetic disc, a magnetic tape, etc. In other words, edge adaptive interpolation and noise filtering according to embodiments of the present invention may be embodied in the form of a program including code for realizing the method described herein. Additionally, the program may be electrically transferred through any medium, such as a wired or wireless propagating communication signal, and embodiments the present invention further include the equivalents thereof.

According to embodiments the present invention, a method of detecting an object using a camera enables determination of a histogram most similar to a histogram corresponding to a pre-stored object by providing detection windows created in each area with various weights, such that the detection windows rapidly converge to the location of the object. Accordingly, embodiments of the present invention provide an advantage of enabling detection the object without requiring excessive calculation within a system having limited processing capabilities and/or limited memory.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method of detecting an object input via a camera, the method comprising:
    dividing image data including the object into pre-established areas and creating a detection window for each area;
    calculating a histogram for each created detection window;
    determining, for each one of the detection windows, weights for each pixel located within the one of the detection windows according to a determined similarity between a pre-stored histogram corresponding to the object and the histogram corresponding to the one of the detection windows;
    moving each of the detection windows in a direction corresponding to the determined weights according to an average movement, such that the detection windows converge towards the object; and
    selecting, from among the detection windows, a detection window having a histogram with maximum similarity to the pre-stored histogram corresponding to the object from the detection windows converging to the object to thereby detect and track the location of the object.

2. The method of claim 1, wherein each area is selected according to a difference between a previous histogram and a subsequent histogram in a detection window corresponding to the area according to movement of the object for each frames of the image data, and
    wherein a detection window that is closest to the object is detected from among the detection windows by comparing the detection window in a selected area to a characteristic value of each pixel in the pre-stored histogram corresponding to the object.

3. The method of claim 1, wherein the pre-stored histogram of the object is defined by:

$$T = \{t_n\}_{n=1,\ldots,m}, \sum_{n=1}^{m} t_n = 1,$$

where n is an index of a bin for the pre-stored histogram T, m is a total number of bins in the pre-stored histogram T, and $t_n$ is a histogram of n.

4. The method of claim 1, wherein the histogram is created in each of the detection windows for each of the image data frames, with the histogram defined by a detection window represented by:

$$R_i = \{r_n^j\}_{n=1,\ldots,m}, \sum_{n=1}^{m} r_n^j = 1. \text{ for } i = 1, \ldots, k,$$

where i represents an $i^{th}$ area in an image window to which the object is input, k represents a total number of the detection windows in which the histogram is to be calculated, and m is a total number of bins in the pre-stored histogram.

5. The method of claim 1, further comprising:
comparing, for consecutive frames, a similarity level of the histogram in each of the detection windows to a corresponding window in a different consecutive frame; and
deleting any detection windows that have substantially identical pixel values in consecutive frames.

6. The method of claim 5, wherein the similarity of each of the frames in the detection windows is determined according to $$f(R_i^t, R_i^{t-1}) = \sum_{n=1}^{m} \sqrt{r_n^{i,t} * r_n^{i,t-1}}.$$

7. The method of claim 1, wherein each histogram is produced in a multi-dimensional space using edge information obtained through detecting edge and Red/Green/Blue (RGB) channels of each pixel.

8. The method of claim 1, wherein the weights are determined according to $$w_l^j = \sum_{n=1}^{m} \frac{t_n}{r_n^j} \delta[b(x_l) - n],$$

where $w_l^j$ is a weight of an $l^{th}$ pixel in an $i^{th}$ area for which a weight is determined, $b(x_l)$ is a function for obtaining an index of a histogram to which a color of a pixel at a location $x_l$ belongs, n is an index of a bin for the histogram T, and m is a total number of bins in the pre-stored histogram.

9. The method of claim 1, wherein, in the convergence of the detection window towards the object, the average movement of each detection window in the direction corresponding to the determined weights is repeatedly performed in order to calculate a subsequent location of the detection window, according to $$\text{while } \|x^{new} - x^{old}\| > \epsilon$$

$$x^{new} \leftarrow \frac{\sum x_k^{old} w_k^j}{\sum w_k^j},$$

where $w_k^i$ is a weight of a $k^{th}$ pixel in the an $i^{th}$ area for which a weight is determined, $\epsilon$ is a critical value, and x is a location of the detection window.

10. The method of claim 1, wherein the similarity varies according to movement of the object in an image window.

11. The method of claim 1, wherein the pre-stored histogram reflects a characteristic value of the object to be detected.

12. The method of claim 1, wherein the pre-established areas are adjusted according to a size of a screen displaying the image data.

13. The method of claim 1, wherein the average movement of each detection window is determined pixel by pixel in the image window to which the object is input.

14. A non-transitory computer-readable recording medium, in which a program is provided for performing a method of detecting an object using a camera, the method comprising:
dividing image data including the object into pre-established areas and creating a detection window for each area;
calculating a histogram for each created detection window;
determining, for each one of the detection windows, weights for each pixel located within the one of the detection windows according to a determined similarity between a pre-stored histogram corresponding to the object and the histogram corresponding to the one of the detection windows;
moving each of the detection windows in a direction corresponding to the determined weights according to an average movement, such that the detection windows converge towards the object; and
selecting, from among the detection windows, a detection window having a histogram with maximum similarity to the pre-stored histogram corresponding to the object from the detection windows converging to the object to thereby detect and track the location of the object.

15. A portable terminal comprising a recording medium, wherein a program is provided for performing a method of detecting an object using a camera, wherein the method includes:
dividing image data including the object into pre-established areas and creating a detection window for each area;
calculating a histogram for each created detection window;
determining, for each one of the detection windows, weights for each pixel located within the one of the detection windows according to a determined similarity between a pre-stored histogram corresponding to the object and the histogram corresponding to the one of the detection windows;
moving each of the detection windows in a direction corresponding to the determined weights according to an average movement, such that the detection windows converge towards the object; and
selecting, from among the detection windows, a detection window having a histogram with maximum similarity to the pre-stored histogram corresponding to the object from the detection windows converging to the object to thereby detect and track the location of the object.

* * * * *